J. VICIC & H. J. SANDBERG.
AUTOMOBILE TOP.
APPLICATION FILED MAR. 8, 1916.
1,225,377.
Patented May 8, 1917.
2 SHEETS—SHEET 1.
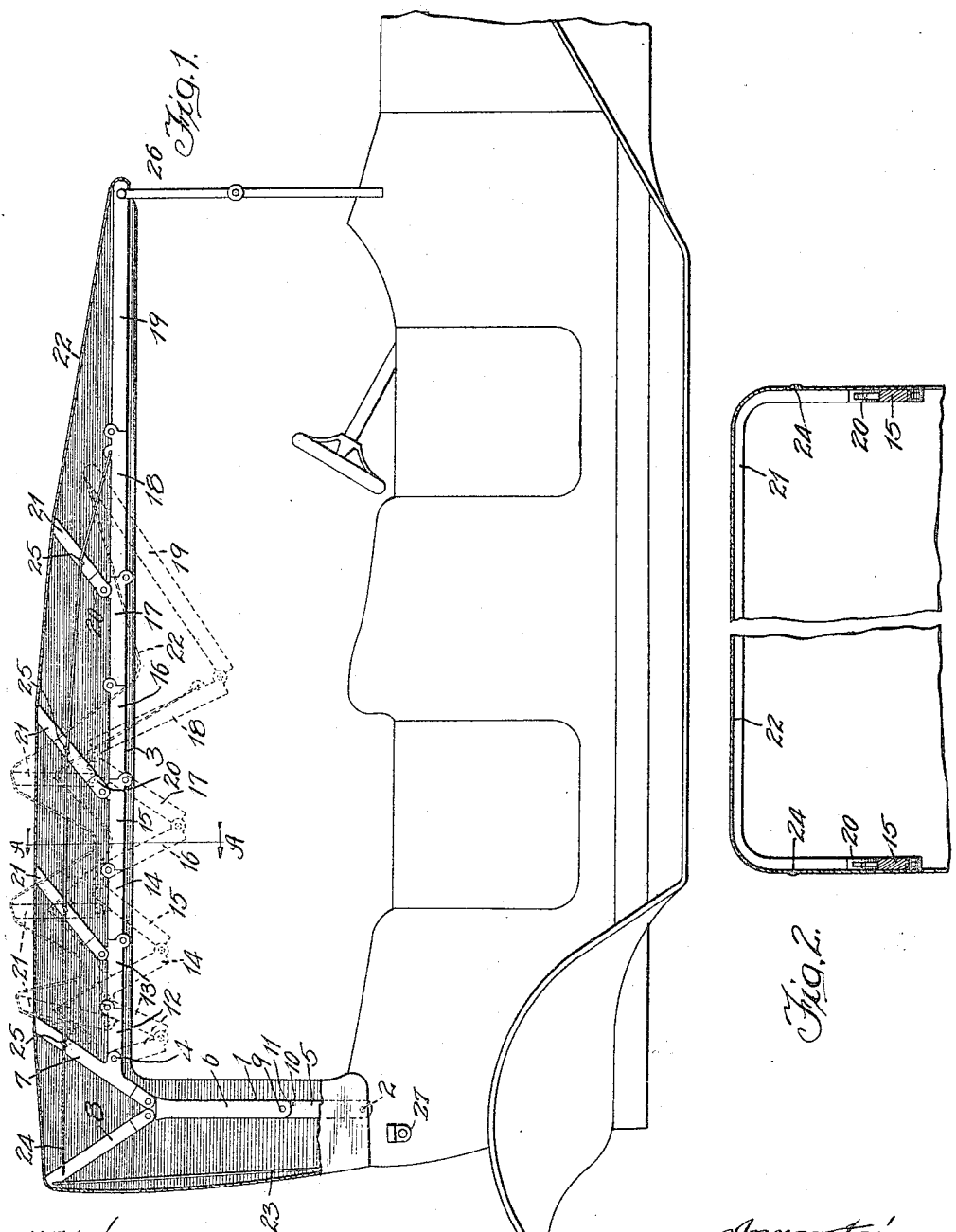
Witness
W. P. Kilroy
Inventors.
Henry J. Sandberg
and John Vicic
By Rummler & Rummler
Attys.

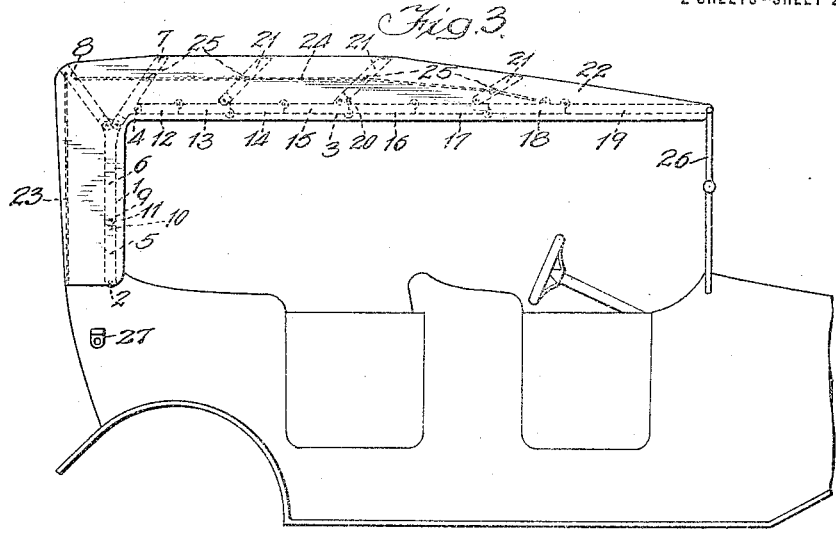
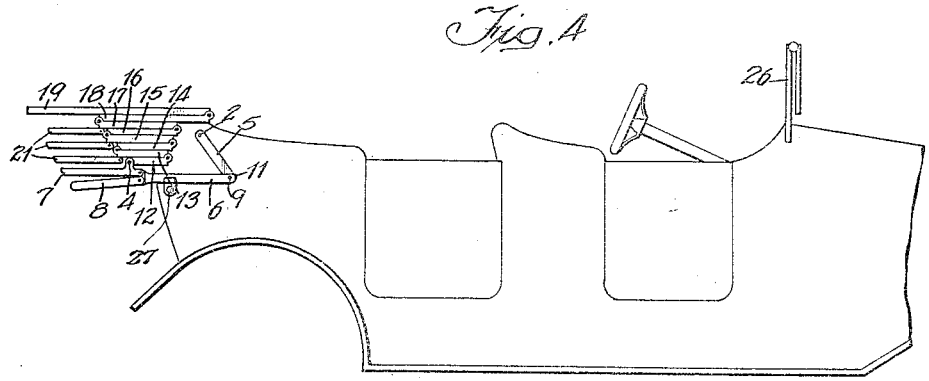
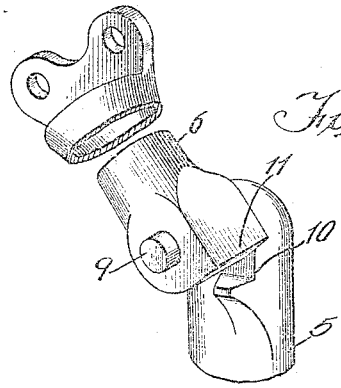

UNITED STATES PATENT OFFICE.

JOHN VICIC AND HENRY J. SANDBERG, OF CHICAGO, ILLINOIS.

AUTOMOBILE-TOP.

1,225,377.  Specification of Letters Patent.  Patented May 8, 1917.

Application filed March 8, 1916. Serial No. 82,960.

*To all whom it may concern:*

Be it known that we, JOHN VICIC, a subject of the Emperor of Austria, and HENRY J. SANDBERG, a citizen of the United States of America, and residents of Chicago, county of Cook, and State of Illinois, have invented certain new and useful Improvements in Automobile-Tops, of which the following is a specification.

An object of this invention is to provide an improved top for vehicles arranged to extend over a vehicle of considerable length, while still compactly foldable in small space.

A further object of the invention is to provide a vehicle top without having supporting members which can interfere with the vision of occupants of the vehicle.

Another object of the invention is to provide a frame for vehicle tops arranged in pivoted sections respectively, having pivoted thereto bow members for supporting the top, all of which sections and bow members are foldable to lie in parallel position and to provide space between said bow members for the cover material of the top.

An illustrative embodiment of this invention is shown in the accompanying drawings, in which—

Figure 1 is a side elevation of a vehicle provided with the improved top showing the cover material of the top in section.

Fig. 2 is a sectional detail taken on line A—A of Fig. 1.

Fig. 3 is a side elevation of a vehicle and the top thereof.

Fig. 4 is a side elevation of a vehicle showing the frame of the top in folded condition but with the cover removed.

Fig. 5 is a perspective detail of the hinge joint of the rear vertical supporting members for the top.

This invention aims to improve folding vehicle tops in such manner that the same may be mainly supported at the extreme rear end of the vehicle and not require supporting members which radiate from a pivotal support more or less forward of the rear end of the vehicle and in position to obstruct the view of occupants of the vehicle. This is accomplished by providing a frame construction for the top which may be mainly supported by uprights pivoted to the extreme rear end of the vehicle, and an arrangement of wire stays also secured to the rear end of the vehicle whereby the top may extend over a vehicle of considerable length in true horizontal position. The horizontally extending members of the frame are reversely foldable against each other and the same carry bow members to which the cover material is secured, said bow members being pivoted to longitudinally extending sections of the frame in such manner that the bow members will form horizontal extensions of said sections when the top is in folded condition.

The embodiment of the invention shown in the drawings comprises vertically arranged supporting members 1, pivoted at 2 to the sides of the vehicle body at the rear end thereof, and horizontally extending members 3 having pivotal connections 4 with said upright members. Each of the upright members comprises sections 5, 6, 7, and 8, the section 5 being shown provided with a stud 9 extending through the lower end of the section 6.

The members 5 and 6 are provided with coacting limiting shoulders 10 and 11 which maintain the members in alinement against pressure in one direction while permitting the same to rock relatively of each other when pressure is applied to force the member 5 to rock forwardly around the pivot 2.

The frame members so far described are preferably formed of metal, the member 6 being shown as of tubular construction. The longitudinally extending parts 3 of the frame comprise a plurality of sections 12 to 19 inclusive, and the sections 13 to 17 thereof have hinged thereto near their forward ends by metallic joints 20, preferably wooden bow-shaped members 21 to which the cover 22 of the top may be secured. The frame members 7 and 8 are also of bow construction, serving to support the cover 22 and extending from the frame member 6 on one side of the vehicle to the frame member 6 on the opposite side.

Secured to each side of the rear end of the body of the vehicle is a wire stay 23 extending upwardly to the side portions of the bow members 8. These members are also connected by wire stays 24 to the sides of the bow members 7 and also the bow-shaped members 21, said stays passing through and preferably secured to the eyes 25 secured to the members 21 and the bow member 7. The members 19 of the frames 3 may be secured to or rest on the upper ends of the windshield 26.

When in folded condition the weight of the top is partly borne by hook-shaped arms 27. In folding the top, the sections 19 of the frame are rocked upwardly and the hinge joints between the sections 17 and 18 are also forced upwardly permitting slack to occur in the stay wires 14 and the braking of the joints between the sections of the frame members 3, as indicated by broken lines in Fig. 1. The sections of the frame members may then be forced rearwardly into contact with each other and the bow members 7 rocked rearwardly against the bow member 8. Then by forcing the pivotal connection between the members 5 and 6 slightly forward beyond a center line, passing through the pivots 2 and the pivotal connections between the members 6 and 8, the weight of the top causes the members 5 to swing forwardly around the pivots 2 until said members come to the position shown in Fig. 4. The sections of the frame members 3 then lie one above the other in parallel relation, as shown in Fig. 4, the members 21 forming extensions thereof, but being fewer in number, provide space between the same for the cover 22 in folded condition.

When the top is in folded condition it is strapped together and properly secured and covered in the customary manner. To again raise the top and extend the same, it is lifted, permitting the arms 5 to swing forwardly and upwardly around their pivots 2, the members 6 also being swung upwardly into alinement with the members 5 with their shoulders 11 engaging shoulders 10. The upper frame members 3 are then extended until the stays 23 and 24 are in stretched condition, as shown in Fig. 3, the member 19 being preferably hooked over or secured to the windshield 26.

Although but one specific embodiment of this invention has been herein shown and described, it will be understood that numerous details of the construction shown may be altered or omitted without departing from the spirit of this invention as defined by the following claims.

We claim:—

1. A folding top for vehicles, comprising pivoted vertically extending supporting arms, a plurality of members extending longitudinally from said supporting arms and having hinged joints which permit of folding said members one against the other alternately in opposite directions, and bow-shaped members for supporting cover material pivotally secured to said members near the hinged joints thereof, whereby said bow-shaped members will be spaced in substantially parallel relation and will form extensions of said hinged members when the top is folded.

2. A folding top for vehicles, comprising pivoted vertically extending supporting arms, a plurality of members extending longitudinally from said supporting arms and having hinged joints which permit of folding said members one against the other alternately in opposite directions, and bow-shaped members for supporting cover material pivotally secured to said members near alternate hinged joints thereof, whereby said bow-shaped members will be spaced in substantially parallel relation and will form extensions of said hinged members when the top is folded.

Signed at Chicago this 6th day of March 1916.

JOHN VICIC.
HENRY J. SANDBERG.

Copies of this patent may be obtained for five cents each, by addressing the "Commissioner of Patents. Washington, D. C."